Dec. 31, 1968  B. R. EDMAN ET AL  3,419,644
METHOD OF FILLING A TUBULAR PART WITH A SOLID, GRANULAR
SUBSTANCE AND A LIQUID SUBSTANCE
Filed Jan. 10, 1967

INVENTORS
BJÖRN RUDOLF EDMAN
OLOF ÖMAN
BY Hane and Nydick
ATTORNEYS

United States Patent Office 3,419,644
Patented Dec. 31, 1968

3,419,644
METHOD OF FILLING A TUBULAR PART WITH A SOLID, GRANULAR SUBSTANCE AND A LIQUID SUBSTANCE
Björn Rudolf Edman, Karlskoga, and Olof Öman, Valåsen, Sweden, assignors to Aktiebolaget Bofors, Bofors, Sweden
Filed Jan. 10, 1967, Ser. No. 608,358
Claims priority, application Sweden, Jan. 21, 1966, 760/66
3 Claims. (Cl. 264—3)

ABSTRACT OF THE DISCLOSURE

There is disclosed a method of charging or filling a tubular member with a mixture of a granular material such as nitrocellulose powder and a hardening liquid such as nitroglycerine. According to the disclosed method, there is provided a tubular member open on one end and having on the other end an inwardly directed flange defining an opening covered with a disc of an elastic self-sealing material adhered to the flange. This member is placed in an upright position with its open end facing upwardly and then filled from the top with the granular material to the desired level. Thereupon the desired volume of the liquid is injected into the tubular member from below by means of an injection tube inserted into the tubular member by piercing the self-sealing disc. Finally, the injection tube is withdrawn, the hole in the disc being automatically reclosed by the self-sealing property of the disc. If desired the top of the mixture can be covered with a perforated disc.

---

The present invention relates to a method of charging or filling a tubular member which, when being filled, is in a vertical position, with a granular substance from above and with a liquid substance from below, in such a way that the liquid substance fills the interstices between the granular particles. Further, the two substances are to have such properties that, after having been fed into the tubular part, they form a single, rigid unit, possibly conjointly with the tubular member. Such a procedure is used when producing propellant powder, for instance rockets. For this purpose, granular substance may consist of nitrocellulose powder, plus the additives required. The liquid substance may consist of a gelatinization agent, which may comprise nitroglycerine or other nitrate esters, with or without desensitizing agents. When producing such rocket powder, according to one procedure, a tube has been used which has not been closed at its ends. This tube is placed on a perforated base, after which it has been filled with a single-base powder. Thereafter, the gelatinization agent is inserted into the tube through the perforation. When the filling has stiffened, the filled tube is removed, whereupon the end at which the gelatinization agent is added has been closed with a disk made of a suitable material.

Another method of filling of the above-mentioned tube with single-base powder and a gelatinization agent is that a tube which is open at both ends is provided at one end with a sleeve which is entirely closed at one end, except for a pipe stub. The closed pipe is placed vertically during filling, with the closed end down facing. The single-base powder is filled, as previously mentioned, from above, and the gelatinization agent is inserted from below, through said pipe stub. When the contents of the filled tube have stiffened, the pipe stub is cut off, and the remaining opening is covered with a disk made of a suitable material.

The purpose of the present invention is to simplify the method of filling a tube with a granular substance and a liquid substance, in that no further operations is necessary after the filled-in material has stiffened.

The method according to the present invention is carried out by partly closing the tube at its lower end by a flange which is directed inwards, and by covering the remaining opening with a disk made of elastic material, the disk is being fastened to the flange by means of some suitable adhesive, and further, by feeding the liquid substance into the tube through a tube, inserted through a disk made of self-sealing elastic material. As a result the hole made by the tube is closed after the filling is completed and the tube is removed.

The method of the invention will be described in more detail in connection with the attached three figures, which show three different working phases in the production of a powder charge.

Figure 1:
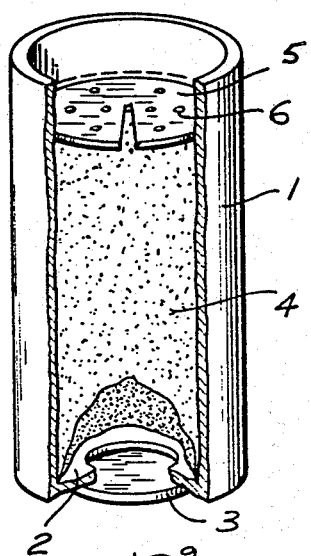
Figure 2:
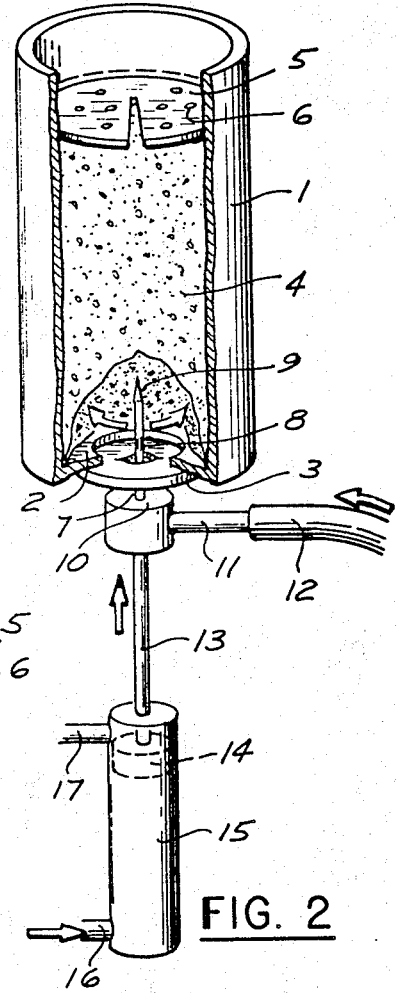
Figure 3:
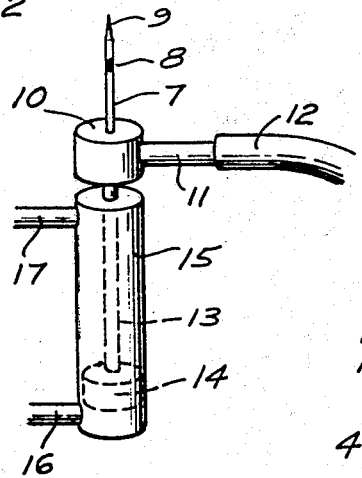

In the figures, 1 is a tube, which is provided with a flange 2, which is directed inwards. The tube and the flange are appropriately made of one and the same material, such as cellulose acetate. The purpose of the tube is to prevent ignition on the cylindrical surface of filled-in material and, possibly, also to serve as heat insulation for a motor wall located outside of it. The opening which is defined by the tube flange 2 is covered with a disk 3, of an elastic material, for instance rubber. The disk is fastened to the flange by means of some appropriate adhesive. The tube thus closed is filled with a nitrocellulose powder. On top of the powder charge, a disk 5 is placed, the purpose of which is to keep the nitrocellulose powder in place. The disk is provided with holes 6. The tube thus filled is placed above a tube 7, similar to an injection needle of a syringe, that is, the tube is provided with an outlet hole 8 and a point 9. The tube is extended at one end into a head 10, to which a pipe stub 11 is connected. The pipe stub, in turn, is connected to a conduit 12, connected to a container for a gelatinization agent. The pipe stub 11 communicates with the injection tube, so that the gelatinization agent can be supplied to the tube 7 from the container for the gelatinization agent. The head 10 is fastened to one end of a rod, the other end of which is provided with a piston 14, which is slidable in a cylinder 15, provided with inlet and outlet openings 16 and 17. Depending upon how fluid or gas is fed to the inlet and outlet connections 16 and 17, the tube can be raised and lowered, as many be noted from FIGURES 2 and 3. If the tube is raised, as shown in FIGURE 2, it is caused to penetrate through the disk 3 into the position shown in the figure. When this has taken place, liquid substance is supplied to the inside of the tube 1 through the end of the tube, until the powder is substantially saturated and the liquid substance emerges somewhat through the holes 6. Thereafter, the tube is withdrawn, as may be noted from FIGURE 3. The hole which the tube has made in the disk 3 closes automatically, due to the fact that the disk 3 is made of elastic material. The contents filled into the tube 1 stiffen after a time, and when this has taken place, no further working operations at the closed end of the tube are required.

From the foregoing, it will be clearly noted that the invention is particularly suited for the production of rocket motors which are to burn from one end only, viz. the upper end, and not from the cylindrical surface, but it should be obvious that the invention is not limited to this application only, but can be applied on all occasions when it is desired to fill a tube with a mixture of a solid and a liquid substance, which thereafter harden to form a coherent body.

What is claimed is:
1. A method of charging a tubular member with a mixture of a granular material and a hardening liquid, said method comprising in combination the following steps:

provuding a tubular member open on one end and having on the other end an end wall including an aperture;

adhering a disc made of an elastic self-sealing material to said end wall covering the aperture therethrough;

placing said tubular member in an upright position with the open end thereof facing upwardly;

filling the tubular member from above with the granular material to the desired level;

inserting an injection tube into the tubular member from below by piercing the portion of the disc covering said aperture and injecting a desired volume of hardening liquid into the tube; and withdrawing said injection tube, the hole in the disc as left by the injection tube being sealed by the self-closing property of the disc material whereby the tubular member and the mixture of granular material and liquid therein upon hardening of the liquid constitute a solid body.

2. The method according to claim 1 and further comprising the steps of covering the top layer of the granular material with a perforated disc, and injecting hardening liquid into the tubular member until the liquid begins to percolate through the perforations of said cover disc.

3. The method according to claim 1 wherein the tubular member is first filled to the desired level with granulated nitrocellulose and then nitroglycerine in liquid form is injected into the tubular member.

References Cited

UNITED STATES PATENTS

| | | | |
|---|---|---|---|
| 3,027,597 | 4/1962 | McCurdy | 264—3 |
| 3,189,946 | 6/1965 | Ciaio | 18—30 |
| 3,202,730 | 8/1965 | Gordon et al. | 264—3 |
| 3,205,286 | 9/1965 | Black | 264—3 |
| 3,222,433 | 12/1965 | Makay | 264—3 |

CARL D. QUARFORTH, *Primary Examiner.*

M. J. GREAL, *Assistant Examiner.*

U.S. Cl. X.R.

18—30; 60—253; 86—1; 264—328